(12) United States Patent
Rund et al.

(10) Patent No.: US 7,561,982 B2
(45) Date of Patent: Jul. 14, 2009

(54) PHYSICAL ATTRIBUTE RECORDING METHOD AND SYSTEM

(75) Inventors: Richard Rund, Great Falls, VA (US); Pierre Charlety, Hong Kong (CN); Ma Huai Wang, Zhaoqing (CN); Quan Zhi Yong, RongCheng Town (CN)

(73) Assignee: Shake Awake Products, LLC, Great Falls, VA (US)

( * ) Notice: Subject to any disclaimer, the term of this patent is extended or adjusted under 35 U.S.C. 154(b) by 0 days.

(21) Appl. No.: 11/558,892

(22) Filed: Nov. 10, 2006

(65) Prior Publication Data

US 2007/0116084 A1 May 24, 2007

Related U.S. Application Data

(60) Provisional application No. 60/735,193, filed on Nov. 10, 2005.

(51) Int. Cl.
*G01K 11/00* (2006.01)
*G01K 1/20* (2006.01)

(52) U.S. Cl. .................................................. 702/130
(58) Field of Classification Search .................. 702/130
See application file for complete search history.

(56) References Cited

U.S. PATENT DOCUMENTS

| | | | | | |
|---|---|---|---|---|---|
| 3,975,720 | A | * | 8/1976 | Chen et al. | 219/712 |
| 4,008,614 | A | * | 2/1977 | Turner et al. | 374/158 |
| 4,183,248 | A | * | 1/1980 | West | 374/164 |
| 4,309,585 | A | * | 1/1982 | Doi et al. | 219/720 |
| 4,411,535 | A | * | 10/1983 | Schwarzschild | 374/165 |
| 4,648,055 | A | * | 3/1987 | Ishizaka et al. | 702/131 |
| 5,025,248 | A | * | 6/1991 | Bergeron | 340/596 |
| 5,088,837 | A | * | 2/1992 | Shiokawa et al. | 374/185 |
| 5,575,563 | A | * | 11/1996 | Chiu et al. | 374/141 |
| 5,710,409 | A | | 1/1998 | Schwarzbacker et al. | |
| 5,939,974 | A | | 8/1999 | Heagle et al. | |
| 6,501,384 | B2 | * | 12/2002 | Chapman et al. | 340/584 |

(Continued)

FOREIGN PATENT DOCUMENTS

GB 2 408 103 A 5/2005

OTHER PUBLICATIONS

Apple Computer, iPod shuffle, printed on Nov. 7, 2005.

(Continued)

*Primary Examiner*—Michael P. Nghiem
*Assistant Examiner*—Cindy H Khuu
(74) *Attorney, Agent, or Firm*—General Counsel, P.C.

(57) ABSTRACT

An exemplary method for recording measurements derived from a probe includes receiving a probe identification from a probe, receiving a start instruction, receiving at least one signal from the probe after receiving the start instruction, and converting the at least one signal into a reading based on at least the probe identification. An exemplary system for measuring an attribute includes a controller unit having a processor, a memory connected to the processor, a display connected to the processor, a control interface connected to the processor, and a connection module connected to the processor; and at least one probe, each probe having a sensor, elements to provide identification of the type of probe, and a connector for connecting to a connection module of the controller unit. A further exemplary controller unit includes software for performing the exemplary method.

20 Claims, 7 Drawing Sheets

U.S. PATENT DOCUMENTS

| | | | |
|---|---|---|---|
| 6,522,912 B1 * | 2/2003 | Nakatani et al. | 600/474 |
| 6,568,848 B1 | 5/2003 | Chapman et al. | |
| 6,850,861 B1 * | 2/2005 | Faiola et al. | 702/130 |
| 6,854,883 B2 * | 2/2005 | Rund et al. | 374/208 |
| 6,890,096 B2 * | 5/2005 | Tokita et al. | 374/163 |
| 6,979,122 B2 * | 12/2005 | Yu | 374/208 |
| 7,201,099 B2 | 4/2007 | Harris, Jr. et al. | |
| 2002/0181539 A1 * | 12/2002 | Sato et al. | 374/121 |
| 2005/0261991 A1 | 11/2005 | Kennamer | |
| 2006/0213904 A1 | 9/2006 | Kates | |
| 2008/0120188 A1 * | 5/2008 | Mobley et al. | 705/15 |

OTHER PUBLICATIONS

Cole-Parmer Instrument Company, Specifications 18200-30, Apr. 2006.

www.FoodSafetySource.com, Temperature Control, www.foodsafetysource.com/subcategory.cfm?InfoSubCatID=16, printed on Oct. 30, 2006.

Lascar Electronics, www.lascarelectronics.com, Oct. 28, 2005.

Lascar Electronics, EL-USB-CO Carbon Monoxide (CO) Data Logger with USB Interface, Apr. 2006, Issue 2.

MicroDAQ.com, Lascar USB Temperature Logger, http://www.microdaq.com/lascar/elusb1.php, printed on Feb. 7, 2007.

MicroDAQ.com, TandD USB Temperature Humidity Logger, http://www.microdaq.com/tandd/tr-7u/tr-72u.php, printed on Oct. 30, 2006.

MicroDAQ.com, 1 Channel Temperature Data Logger, http://www.microdaq.com/testo/temperature_humidity/1_channel_temperature_logger.php, printed on Oct. 30, 2006.

MicroDAQ.com, Lascar USB Carbon Monoxide Data Logger, http://www.microdaq.com/lascar/co_data_logger.php, printed on Oct. 30, 2006.

MicroDAQ.com, Temperature Data Loggers, http://www.microdaq.com/data-logger/temperature/1.php, printed on Oct. 30, 2006.

MicroDAQ.com, Temperature Data Loggers, http://www.microdaq.com/data-logger/temperature/2.php, printed on Oct. 30, 2006.

Omega Engineering, Inc., 5 Pack Temperature Data Logger with USB Interface, http://www.omega.com/ppt/pptsc.asp?ref=OM-EL-USB-LITE-5&Nav=tems08, printed on Oct. 30, 2006.

Oneset Computer Corporation, HOBO Temperature Data Logger Guide, http://www.onesetcomp.com/Products/temperature_logger_guide.html, printed on Oct. 30, 2006.

PackWire.com, Temperature probe provides safety record, http://www.packwire.com/news/printNewsBis.asp?id=62414, Sep. 9, 2005.

T&D Corporation, Thermo Recorder TR-71U/TR-72U, 2004.

Two Dimensional Instruments, LLC, Easy Temperature Monitoring System for Food Safety, http://ww.e2di.com/food-safety.html, printed on Oct. 30, 2006.

Two Dimensional Instruments, LLC, Easy Temperature Monitoring ThermaViewer, http://www.e2di.com/t-05.html, printed on Oct. 30, 2006.

Vernier Software & Technology, Vernier EasyTemp, http://www.vernier.com/easy/easytemp.html, Oct. 10, 2005.

* cited by examiner

PHYSICAL ATTRIBUTE RECORDING METHOD AND SYSTEM

This patent application claims the benefit of U.S. provisional patent application No. 60/735,193 filed Nov. 10, 2005, which is hereby incorporated by reference.

I. FIELD OF THE INVENTION

This invention relates to a system for use by individuals needing to record physical attributes that can be measured by a probe being inserted into a substance, a liquid, an environment, or an item whose physical attribute(s) is being measured. An exemplary physical attribute is temperature for multiple foods over a period of time in a food services setting for latter analysis and/or archiving. More particularly, the system is for use in the field of food safety.

II. BACKGROUND OF THE INVENTION

Present techniques for recording temperatures as part of a food safety regimen includes periodically measuring the temperature of different foods or locations. After the thermometer is determined to have stabilized, recording the temperature measured typically using pen and paper. This can lead to illegible handwriting that can not be deciphered, incorrectly recorded temperatures and recording times including putting the wrong temperature in the wrong location on the paperwork, and inefficiencies in recording the information. If a PDA is used to record the temperature information, the only problem eliminated is the illegible handwriting.

The issues of recording temperature become more burdensome, when the individual inspecting a facility serving food is visiting multiple locations. If the individual is recording the old-fashion way with pen and paper, then the paper is prone to being misplaced or lost between locations.

Another issue that can arise is cross-contamination between foods if the thermometer is not cleaned between measurements of different foods and/or food at different cooking stages.

III. SUMMARY OF THE INVENTION

This invention in at least one exemplary embodiment provides a new and useful system for tracking temperatures of multiple mixtures/items over a period of time.

An exemplary embodiment according to the invention includes a method having the steps of receiving a probe identification from a probe, receiving a start instruction, receiving at least one signal from the probe after receiving the start instruction, and converting the at least one signal into a reading based on at least the probe identification. In at least one exemplary embodiment, the method further includes notifying the user when the readings have stabilized with an exemplary notification being an audio alert.

An exemplary embodiment according to the invention includes a system that has a controller unit having a processor, a memory connected to the processor, a display connected to the processor, a control interface connected to the processor, and a connection module connected to the processor; and at least one probe, each probe having means for producing a signal representative of a physical attribute, means for identifying the type of probe, and means for connecting to the connection module of the controller unit. According to at least one exemplary embodiment, the system allows for the controller unit to connect to a variety of probes and convert the signals produced by those probes to provide a reading for a particular attribute being measured. Exemplary probe signal means are sensors able to produce a signal in response to measuring an physical attribute or property An exemplary embodiment according to the invention includes a system that has means for connecting to a probe, means for receiving a start instruction, means for receiving at least one signal from the probe after receiving the start instruction, and means for converting the at least one signal into a reading. The functions of these means in at least one exemplary embodiment are preformed using a mixture of hardware, software, and firmware present on the controller unit.

Given the following enabling description of the drawings, the apparatus should become evident to a person of ordinary skill in the art.

IV. BRIEF DESCRIPTION OF THE DRAWINGS

The aspects of the present invention will become more readily apparent by describing in detail illustrative, non-limiting embodiments thereof with reference to the accompanying drawings.

FIGS. 6A-7 illustrate different functional block diagrams for the connection module according to the invention.

V. DETAILED DESCRIPTION OF THE DRAWINGS

The invention includes exemplary systems and methods for recording physical attributes for example, temperature, pH, salinity, sugar level, flow rate for air or fluid, pressure, distance, and amount of fat present.

The invention includes in one exemplary embodiment an interchangeable system that has a base controller unit 100 that is connectable to a variety of probes 150 for measuring physical attributes as illustrated in FIGS. 1-5. The controller unit 100 includes a connection module 110 that allows it to be connected to different probes 150 and to external devices such as a computer, PDA, cellular telephone. The controller unit 100 illustrated, for example, in FIG. 1 includes a processor 102, which may be a combination of hardware and software; memory (or storage) 104; a control interface 120; a display 106; and a power supply 108. Exemplary processors 102 include a microcontroller or an application specific integrated circuit that runs code to perform the method illustrated in FIG. 8 and described below for operating the system to record physical attributes.

Figure 6A:
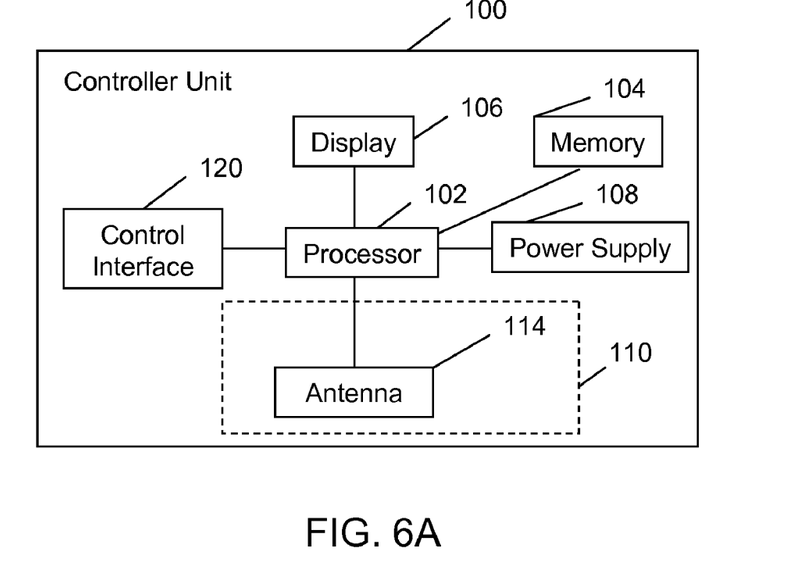
Figure 6B:
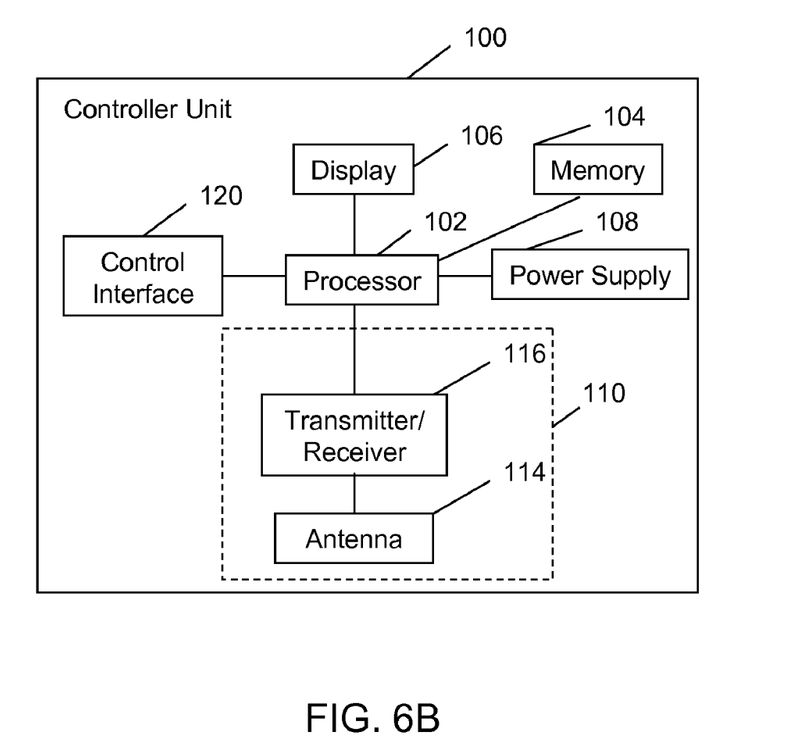
Figure 7:
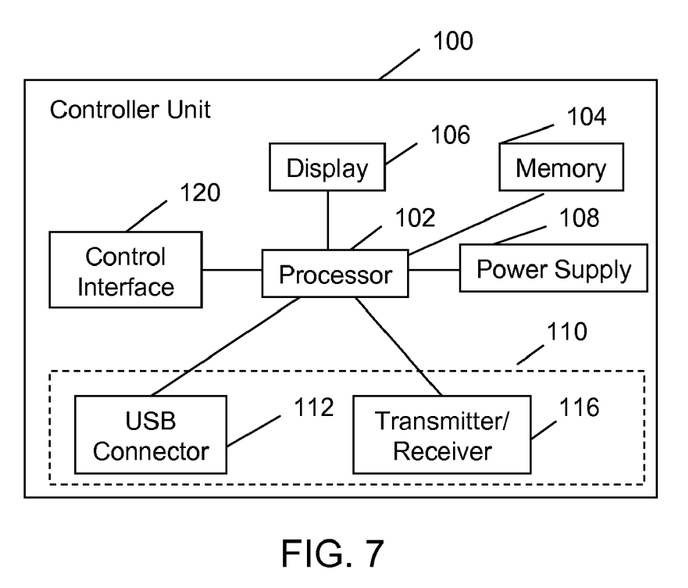

The connection module 110, 910 as illustrated in FIGS. 2, 6A-7, 9A, and 9B can have a variety of configurations that allow communication with a probe 150 and/or external device like a computer 1000. FIG. 6 illustrates the connection module 110 including a USB connector 112, which in most embodiments is a male connector to facilitate connection to a computer; however, other computer connectors may be used in place of the USB connector like Firewire, serial, and parallel. FIG. 6A illustrates the connection module 110 including an antenna 114 to facilitate wireless communication with an external device including, for example, a computer, a PDA, and a cellular telephone. FIG. 6B illustrates a transmitter/receiver 116 connected between the processor 102 and the antenna 114. The transmitter/receiver 116 can be an unitary configuration or two separate components. As one of ordinary skill in the art will appreciate there are a variety of wireless standards that can be utilized to establish the communications link. FIG. 7 illustrates a combination of connectors, i.e., a USB connector 112 and a transmitter/receiver 116. In this embodiment, the USB connector 112 could be utilized to connect with a probe 150 while the transmitter/receiver 116 could be utilized to wirelessly connect with an external device using, for example, infrared or Bluetooth. A further exemplary connection module includes a plug for engagement of a socket on a probe unit, or vice versa.

Figure 2:
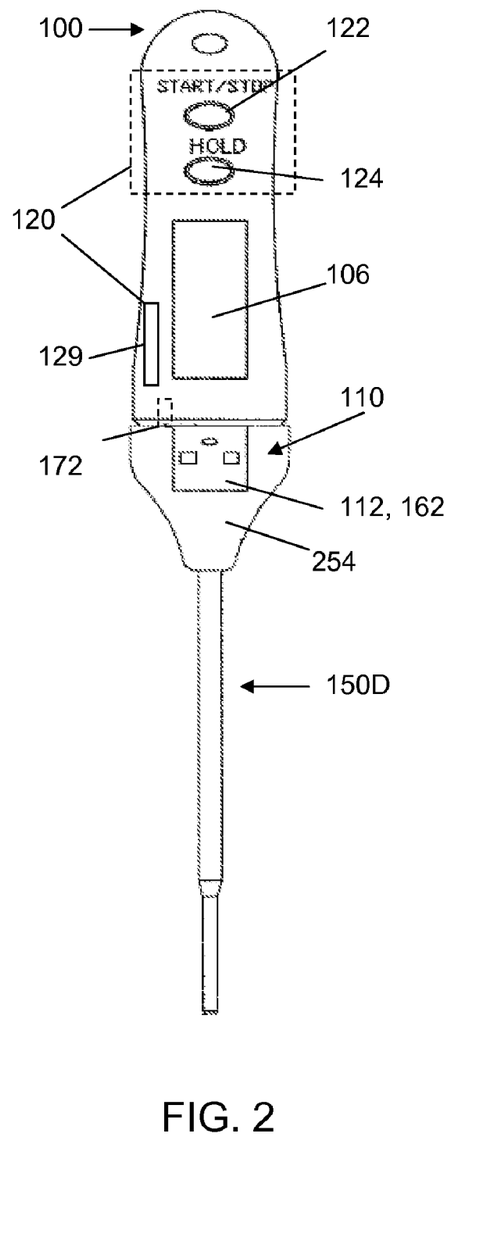
FIGS. 2-5 depict an exemplary controller unit attached to different exemplary probe units and control interfaces according to the invention.

In at least one exemplary embodiment, the connection module 110 includes an interface for connecting with a probe 150 with a key configuration such that pins, posts or other structures are present on the probe 150 to engage the interface in such a way that each combination of features on the probe 150 would be indicative of a probe type. FIG. 2 illustrates a probe 150D with a pin 172 shown in dashed lines as it is inside the controller unit 100. One exemplary way for the identification to occur is that the engagement activates at least one button/switch or similar mechanisms to complete a circuit such that identification of the probe 150 is achieved based on the alignment or arrangement of pins on the probe 150.

As illustrated, for example, in FIG. 2 an exemplary connection between the controller unit 100 and a probe 150D is via an USB connector 112, 162, but a variety of other connections that allow for connection and disconnection are possible. The USB connector 112 allows for easy connection to a computer to download information from the controller unit 100 and/or updating software and information on the controller unit 100. If an USB connector 112 is not part of the system, then other connections are possible including wireless connections to connect the controller unit to other devices such as computers, PDAs, and cellular telephones.

Figure 3:
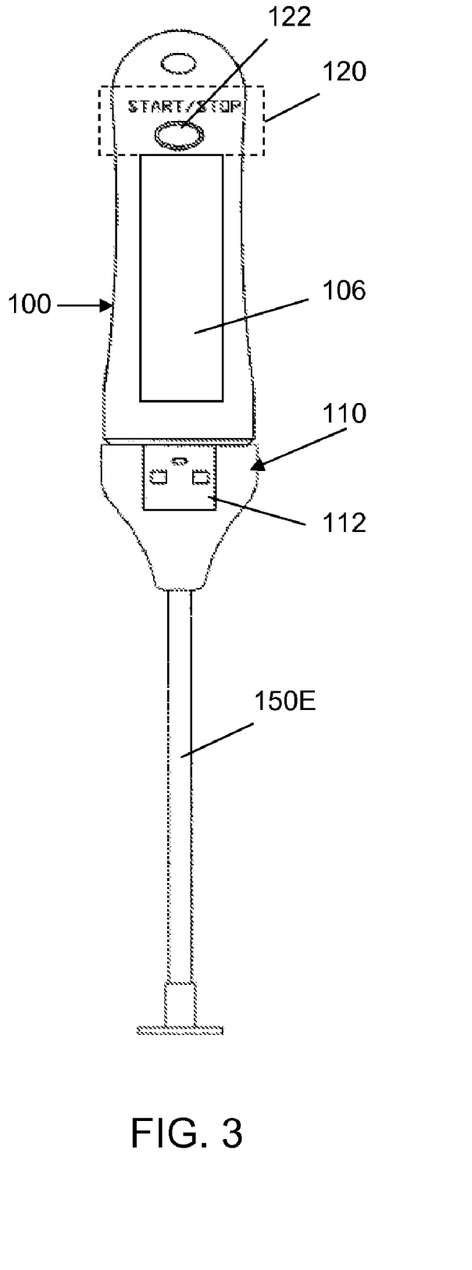
Figure 4:
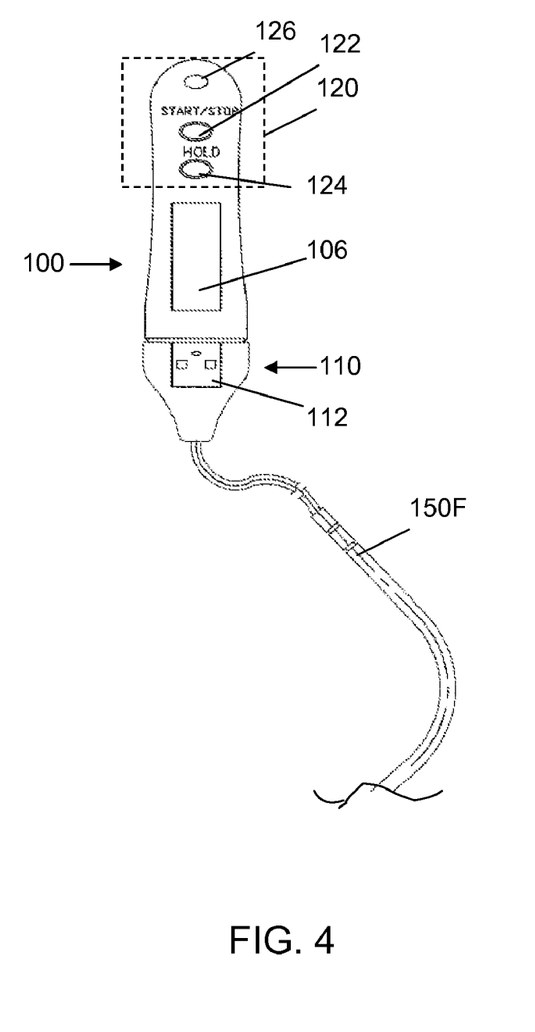
Figure 5:
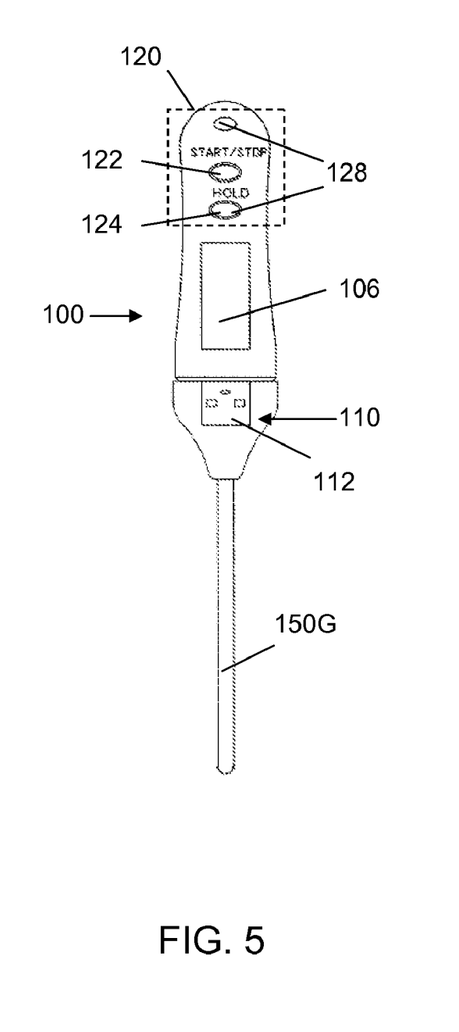

FIGS. 2-5 illustrate an exemplary arrangement for the control interface 120. The control interface 120 as illustrated includes a start/stop button 122 and a hold button 124. The start/stop button 122 is the control for beginning a measurement session with the button also serving as the control to stop the measurement session and in at least one embodiment for turning the power off on the controller unit 100. Although two separate buttons may be used for starting and stopping. The hold button 124 is for holding the current measurement such as temperature to allow the user to view the measurement on the display 106. In at least one exemplary embodiment, the hold button 124 is omitted as illustrated in FIG. 3 and its functionality is provided by the processor displaying a stabilized measurement. The control interface 120 may also include an on/off button 126 (as illustrated in FIG. 4) and/or a scroll wheel/set of buttons for allowing the user to go through a list of items to measure and/or the type of probe 150 to be connected to the controller unit 100. The control interface in at least one exemplary embodiment includes buttons 128 for accepting and remeasuring a reading as illustrated in FIG. 5 where the hold button 124 in this illustration is also for acceptance.

The control interface 120 in at least one exemplary embodiment includes a scroll wheel 129 (illustrated in FIG. 2), dial or graphical controller that allows the user to scroll through information and/or past readings. In some embodiments, the scroll wheel, dial or buttons (used as up/down keys) are used to select the type of probe that is connected.

In at least one exemplary embodiment, the control interface 120 allows the user to enter information associated with the reading being taken such as location, time and date, type of measurement, what was the measurement taken from, and other relevant information associated with the measurement for latter retrieval along with the readings that are obtained.

The buttons and scroll wheel can serve multiple purposes and be implemented, for example, as mechanical elements that allow for an actuation to occur or signal created, graphical controller elements, and/or touchscreen/pad elements.

The display 106 is connected to the processor 102 for at least the purpose of providing the information to be shown on the display 106 based upon input from the user and/or the current attribute being measured and/or displayed. The display 106 in some embodiments displays information of interest related to the measurements the probe 150 being used is designed for. Examples include food safety temperature ranges for food in a buffet line or being cooked, temperature cool down guidelines, acceptable pH and chlorine ranges for a pool, acceptable ranges for sugar levels for a human, and wind ranges for classifying a storm or hurricane.

An exemplary power supply 108 is a lithium ion battery although other types of batteries could be used as the power supply 108. In an embodiment where the connection module includes an USB connector 112, the power supply 108 in at least one embodiment can be recharged when the controller unit 100 is connected, for example, to a computer 1000. Although the power supply 108 in at least one exemplary embodiment is recharged using a charging unit plugged into the wall or by replacing the batteries.

The memory 104 as illustrated is a generic memory unit that is able to communicate with a computer and hold multiple measurements over a period of time, for example, a work shift, a day, a week, or a month. In an embodiment, where the controller unit 100 is configured to work with multiple types of probes 150, the memory 104 will store the code and/or configuration setup for converting the signals received from the probe 150 into an appropriate reading. In embodiments where additional information is provided to the user based, for example, on the connected probe 150, the memory 104 will store that information for recall by the processor 102 based on the probe identification.

Figure 1:
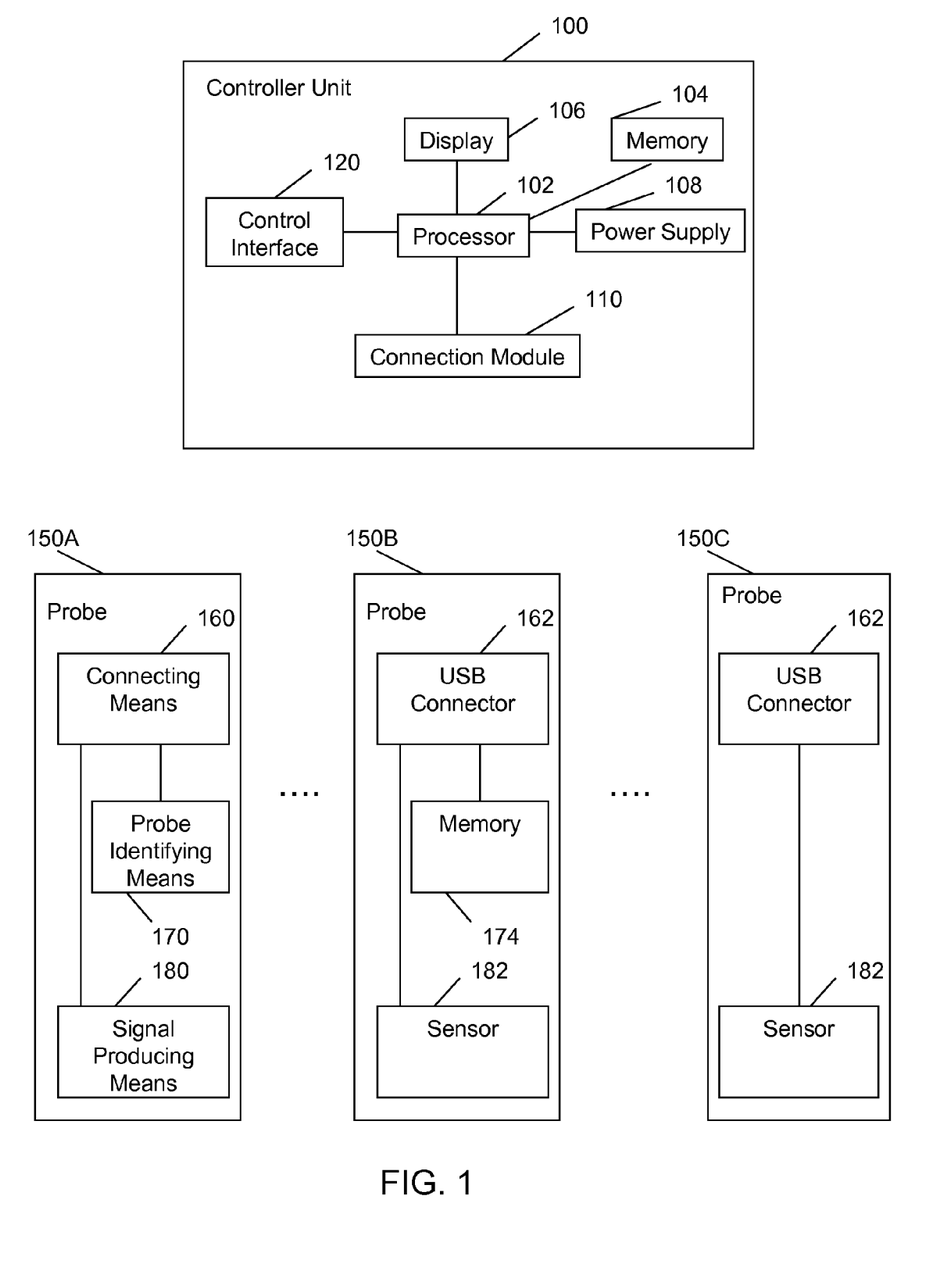
FIG. 1 illustrates an exemplary system according to the invention that includes three exemplary probes.

As illustrated in FIGS. 1-5, the probe 150 may take a variety of forms depending upon the physical attribute being measured. FIG. 1 illustrates three different probe structures. Exemplary probe 150A is illustrated as including a connecting means 160, a probe identifying means 170, and a signal producing means 180. Exemplary signal producing means includes sensors 182 such as a thermistor or other circuit element responsive to heat/cold for temperature; an electrode for detecting pH; a transducer for detecting pressure; a gear mechanism for monitoring fluid flow (liquid or air) with a counter, which a similar wheel setup with a counter can be used for measuring distance; a light source and a light detector to measure the amount of light reflected or passing through a substance or environment to detect the level or concentration of different material, particles, or gas; electrodes for measuring salinity, chlorine, or fat; and a laser rangefinder for distance.

Exemplary probe 150B is illustrated as including an USB connector 162 as the connecting means 160, a memory 174 as the probe identifying means 170, and a sensor 182 as the signal producing means 180. Exemplary probe unit 150C is illustrated as including an USB connector 162 and a sensor 182 for an implementation where one type of probe is for use with the controller unit 100. FIGS. 2-5 illustrated a variety of probes 150D (insertion probe such as a probe using Quick Tip technology available from F.O.B. Instruments Ltd.), 150E, 150F (a cable probe for reaching more difficult areas and/or areas at a distance from the user), and 150G (insertion probe).

Exemplary connecting means 160 includes an USB connection 162 such as a female connection and a plug or socket configuration. Together these examples are means for connecting 160 to the connection module 110 of the controller unit 100, and as such will have a complementary connection for the connection present on the controller unit. Exemplary purposes of the connecting means 160 include allowing for signals to be communicated to the controller unit 100 for processing and in some embodiments to receive activation and on/off signals from the controller unit 100.

Another exemplary probe identifying means 170 is memory (or storage) 174 with data identifying the type of probe the probe 150B is such that the memory 174 can be read by the controller unit 100. Based on this data the controller unit 100 will be able to process the signal provided by the probe 150 into a reading. In at least one exemplary embodiment, the data includes additional information as to the intended use of the probe 150 based upon the probe configuration, for example, the probe 150 may be more responsive to a particular temperature range. In the case of a temperature probe, the data in at least one exemplary embodiment includes food safety information that can be displayed by the controller unit.

Depending upon the implementation, the inclusion of a key identification system 172 as discussed above in the probe 150D can be part of the connecting means 160 in that it does engage the controller unit 100 and the probe identifying means 170 as it identifies the type of probe based on the key configuration on the probe 150.

As mentioned above, the signal producing means 180 includes sensors 182 for measuring a variety of physical attributes. One feature of the system is that one controller unit 100 can work with a variety of probes 150 configured to measure different things such as temperature, pH, salinity, fat, sugar, distance, air flow, etc. One exemplary way to accomplish this is that the probe 150 provides information to the controller unit 100 to let it know the physical attribute the probe 150 can measure. In response, the controller unit 100 retrieves code or otherwise configures itself to receive signals from the probe 150 and convert the signal into a reading for display, storage, and/or transmission.

The controller unit 100 preferably is in the size range between an USB memory unit and approximately 3.5" by 0.5" by 1". This size provides the advantage of easy portability between locations along with easy handling during use when connected to a temperature probe unit over current day PDA or handheld printer units used for food safety management activities. The ability to transfer the recorded information from the control unit to a computer or other external processing device provides archival and storage for past measurements.

In at least one exemplary embodiment, the controller unit 100 includes a clock to allow for date stamping of readings. In at least one exemplary embodiment, the controller unit 100 includes a timer function to assist in recording relevant data if something needs to be measured over a period of time or certain periods of time need to pass before another measurement is taken.

Figure 8:
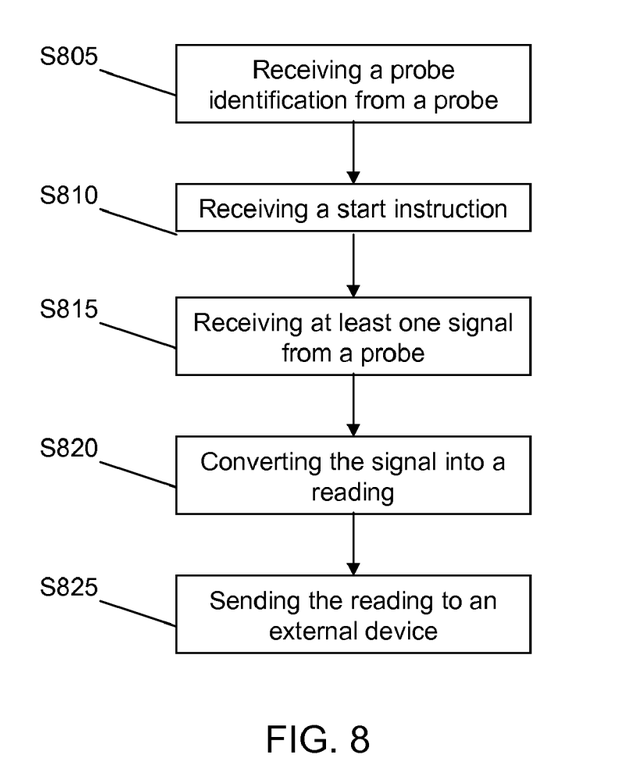
FIG. 8 depicts a flowchart illustrating an exemplary method according to the invention.

FIG. 8 illustrates an exemplary method according to the invention for operation of the controller unit 100 working with a probe 150. Upon the controller unit 100 recognizing the probe 150, the controller unit 100 receives an identification of the type of probe the probe 150 is, S905. This typically would happen when the controller unit 100 is turned on with the probe 150 already attached or the probe 150 is then inserted after the controller unit 100 is on. The controller unit 100 receives a start instruction, S810, such as a user pressing a start button 172 or a predetermined measurement is programmed to occur. In response to the start instruction, the controller unit 100 receives at least one signal from the probe 150 that represents a measurement of something, S815, such as temperature, pH, salinity, sugar level, flow rate, pressure, distance, and fat. The received signal is converted into a reading, S820. One of ordinary skill in the art will appreciate that once a probe 150 receives power and/or reacts with the environment, a signal will be produced, which in one embodiment where thresholds are monitored the signals are converted so that the controller unit 100 can track the physical attribute over time. Typically the signal will be a continuous feed into the controller unit 100, with the reading continually changing until such a point that it stabilizes; although the controller unit 100 may activate the probe 150 for periodic sampling. Exemplary ways to determine whether the reading has stabilized include: the readings are within two percent of each other for one of a period of at least ten readings; the readings are within two percent of each other for one of a period of less than thirty seconds, particularly less than fifteen seconds, and more particularly less than 1 second; three consecutive readings are within a range of ±1 percent; in the case of temperature, three consecutive readings are within a range of ±0.5 degrees Fahrenheit or when a plurality of readings are within ±1 degree Fahrenheit of each other. Once the reading is obtained, the reading can be stored in memory 104 for later retrieval, displayed, cause a notification once it has stabilized, and/or be sent to an external device. In the exemplary method illustrated in FIG. 8, the reading is sent to an external device when a communications link is available, S825. As discussed above, exemplary links include a wireless connection or USB (or similar) connection.

The sending of the reading in some embodiments includes the establishing of the connection with the external device, for example, be plugged into or wirelessly establishing a link via Bluetooth, infrared, or other wireless protocols. In other embodiments, the reading is sent after the signal received from the probe 150 is converted.

In an embodiment where the reading is allowed to stabilize, the method further includes determining when the reading has stabilized, storing the stabilized reading, and the reading sent is the stabilized reading. In an embodiment where the reading is allowed to stabilize, notifying the user that the reading is stabilized. Exemplary notifications include audio via a speaker driven by the processor, visual via a display or light(s) driven by the processor, vibration via a transducer driven by the processor, electronic message sent via the connection module, or a combination of two or more of these. Exemplary audio notifications include a "beep-beep," buzzer or "bi-bi." An exemplary frequency for playing the audio notification is 1 Hz which may increase in octaves or volume for later cycles of the audio notifications. Exemplary visual notifications can be given on the display or a light(s) activating, changing color, content, and/or flashing. An exemplary electronic message notification includes sending or transmitting a notification/alert message to a cellular telephone, computer, or other external device.

In at least one embodiment, the reading is displayed to allow the user to accept it prior to it being stored or sent. If the user determines there is a problem or potential issue with the reading, obtaining a new reading.

In at least one embodiment, the method includes providing (or displaying) information associated with the reading being taken automatically or in response to a request, for example, from a user. Examples of information include food safety temperature ranges for food in a buffet line or being cooked, temperature cool down guidelines, acceptable pH and chlorine ranges for a pool, acceptable ranges for sugar levels for a human, and wind ranges for classifying a storm or hurricane. Other examples are past readings or ranges that readings have been for a particular type of probe and/or location where the readings are being taken. This type of information would allow the user to see if the current reading is out of the historical ranges, which in an embodiment where the user can retake the reading will assist the user in making that determination. In an implementation where this information is provided, in at least one embodiment updating the information as standards or other information is changed/improved.

Figure 9A:
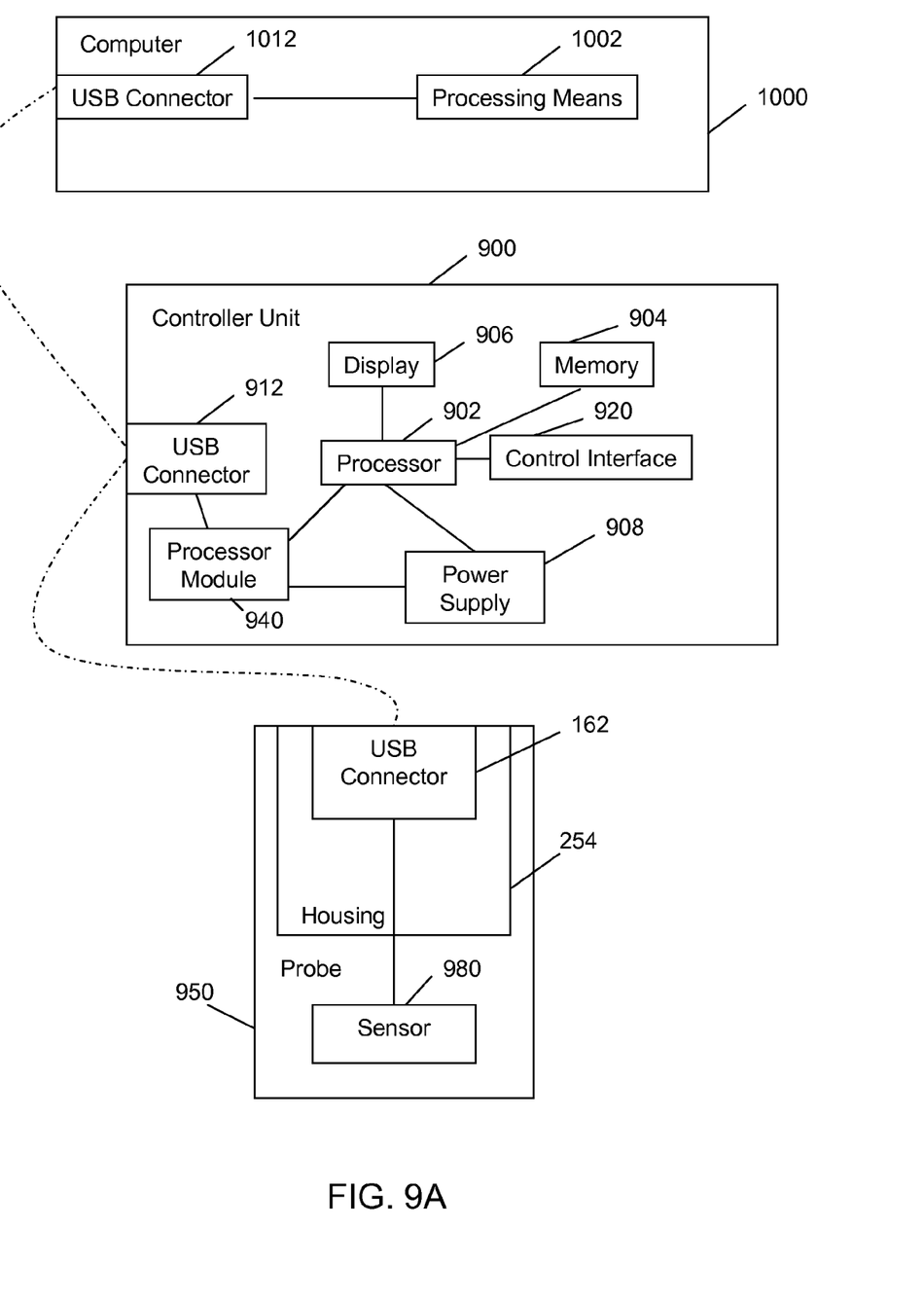
FIGS. 9A and 9B illustrate exemplary systems according to the invention.
Figure 9B:
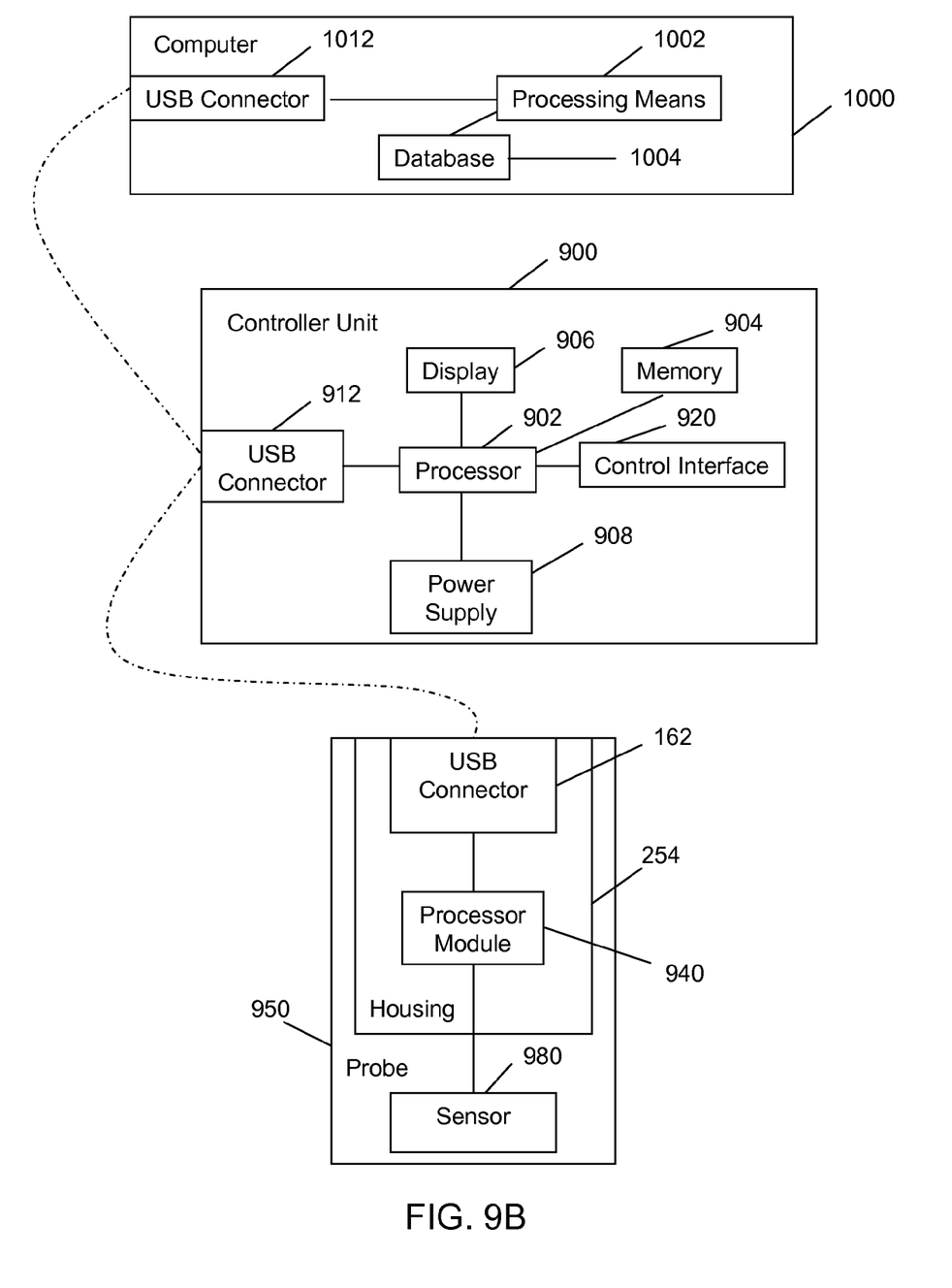

Another exemplary controller unit 900 is illustrated in FIGS. 9A and 9B that includes a processor 902, a memory 904, a display 906, a power supply 908, and a control interface 920.

The probe 950 includes a female USB connection 962 for connecting with the controller unit 900. The probe 950 includes a temperature measuring unit/component (such as a sensor or thermistor) 980. As illustrated, for example, in FIG. 2, the probe 150 includes a housing 254 around the female USB connection 162.

The system in either the probe 950 or the controller unit 900 includes a processor module 940 for receiving data outputted from the probe 950, analyzing the data to determine the temperature of the item being measured, and providing that information to the processor 902 so that it may be displayed on the display 906. The processor module 940 also receives information entered by the user via the control interface 920.

In at least one embodiment, the processor module 940 includes software and/or circuitry to receive the signal directly from the probe unit 950 and process the signal to determine the temperature based on the type of probe unit 950 being used. If the processor module 940 is present in the controller unit 900, then the probe 950 preferably would include a memory 174 or other mechanism 172 to provide information to the processor module 940 identifying the type of probe the probe unit 950 is as illustrated in FIG. 9A. In at least one embodiment, the processor module 940 is located in the probe unit 950 and is specifically configured for that particular type of probe 950 as illustrated in FIG. 9B.

Processing means 1002 as illustrated in exemplary FIGS. 9A and 9B is located on a processing device such as a computer 1000 that includes a female USB connector 1012. The processing means 1002 is capable of retrieving the temperature data and date stamp information if such information is stored by the processor 902 in the memory 904. The processing means 1002 in at least one embodiment is capable of storing the retrieved information in a database 1004 for later use and/or retrieval. The processing means 1002 also includes in at least one embodiment memory utilities for removing data after it has been transferred. In at least one embodiment, the processing means 1002 is able to download software or other code segments onto the processor module 940 for working with different types of probes 950 including probes for sensing other things than temperature.

Those having ordinary skill in the art will recognize that the state of the art has progressed to the point where there is little distinction between hardware and software implementations of aspects of apparatuses. There are various configurations by which processes and/or systems described herein can be effected, for example, hardware, software, and/or firmware.

The foregoing detailed description has set forth various embodiments of the devices and/or processes via the use of block diagrams, flowcharts, and examples. Insofar as such block diagrams, flowcharts, and examples contain one or more functions and/or operations, it will be understood by those within the art that each function and/or operation within such block diagrams, flowcharts, or examples can be implemented, individually and/or collectively, by a wide range of hardware, software, firmware, or any combination thereof (or means for performing the respective function and/or operation). However, those skilled in the art will recognize that the embodiments disclosed herein, in whole or in part, can be equivalently implemented in standard Integrated Circuits, via Application Specific Integrated Circuits (ASICs), as firmware, or as virtually any combination thereof, and that designing the circuitry and/or writing the code for the software or firmware would be well within the skill of one of ordinary skill in the art in light of this disclosure.

The exemplary embodiments described above may be combined in a variety of ways with each other. Furthermore, the dimensions, shapes, sizes, and number of the various pieces illustrated in the figures may be adjusted from that shown.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic. As used in this disclosure, "in communication" includes the situations where two pieces abut each other, are connected to each other, engage each other, and integrally formed together as one piece.

Although the present invention has been described in terms of particular embodiments, it is not limited to those embodiments. Alternative embodiments, examples, and modifications which would still be encompassed by the invention may be made by those skilled in the art, particularly in light of the foregoing teachings. The exemplary and alternative embodiments described above may be combined in a variety of ways with each other.

Those skilled in the art will appreciate that various adaptations and modifications of the embodiments described above can be configured without departing from the scope and spirit of the invention. Therefore, it is to be understood that, within the scope of the appended claims, the invention may be practiced other than as specifically described herein.

VI. INDUSTRIAL APPLICABILITY

The above-described invention has a variety of industrial applications.

One such application is in the food safety environment where the tracking of food temperatures is one part of the record keeping process and one way to determine whether a food service location is following the health code. This type of record keeping provides a defense and/or assists with determining what caused an illness. The portability of the device also lends itself to this application as it allows for record keeping with minimal effort and in some situations allows for the use of a probe unit wants before it is discarded to avoid cross-contamination between different foods.

Another application is in site surveys where a variety of probes are used to determine the environmental condition of a section of land. The above-described controller unit allows for multiple types of probes to connect to it and have it record the data for later transfer to a computer or other equipment.

We claim:
1. The method comprising:
   receiving an identification of a probe type, receiving a start instruction,
receiving at least one signal from the probe after receiving the start instruction,
converting the at least one signal into a reading based on at least the probe type identification,
determining when the probe has stabilized, and
storing the stabilized reading, and
wherein storing includes sending the stabilized reading.

2. The method according to claim 1, wherein the probe has stabilized when three consecutive readings are within a range of ±1 percent.

3. A method comprising:
receiving code for use with a probe,
receiving a start instruction,
receiving at least one signal from the probe after receiving the start instruction,
converting the at least one signal into a reading based on at least the code,
displaying the reading,
when acceptance of the reading is received, storing the reading, and
when refusal of the reading is received, repeating receiving the signal, converting, and displaying steps to obtain a new reading.

4. A method comprising:
receiving code for use with a probe,
receiving a start instruction,
receiving at least one signal from the probe after receiving the start instruction,
converting the at least one signal into a reading based on at least the code,
determining when the probe has stabilized, and
notifying a user that a reading is available.

5. The method according to claim 4, further comprising providing information associated with at least one type of reading in response to a request.

6. The method according to claim 4, further comprising receiving updated information relating to at least one type of reading.

7. The method according to claim 4, wherein the reading is a temperature reading.

8. A method according to claim 4, further comprising sending at least one of the at least one reading to an external device when in communication with the external device.

9. The method according to claim 8, wherein sending includes connecting to the external device.

10. The method according to claim 8, wherein sending further includes sending the at least one reading after receiving the reading from the probe.

11. The method according to claim 4, further comprising storing the at least one reading.

12. The method according to claim 4, further comprising:
receiving information regarding the reading from a user, and
associating the received information with the reading.

13. The method according to claim 4, further comprising:
receiving information regarding the location of the reading, and
associating the received information with the reading.

14. The method according to claim 13, wherein the location of the reading is a facility where the reading was obtained.

15. The method according to claim 4, further comprising:
receiving information regarding the type of measurement the reading represents, and
associating the received information with the reading.

16. The method according to claim 4, further comprising:
receiving information regarding details observed by a user associated with the reading, and
associating the received information with the reading.

17. The method according to claim 4, further comprising:
receiving a request for information related to a type of measurements measurable by the probe, and
displaying the requested information.

18. The method according to claim 4, further comprising:
transmitting at least one reading to an external device.

19. A method comprising:
receiving code for use with a probe,
receiving a start instruction,
receiving at least one signal from the probe after receiving the start instruction,
converting the at least one signal into a reading based on at least the code,
determining when the probe has stabilized,
displaying the reading once stabilization has occurred,
retrieving information associated with the reading being taken, and
displaying the information.

20. The method according to claim 19, wherein the reading is a temperature reading and the information includes acceptable temperature information.

* * * * *